(12) United States Patent
Langeman

(10) Patent No.: US 6,755,348 B1
(45) Date of Patent: Jun. 29, 2004

(54) THIRD STREAM AUTOMOTIVE COLOR INJECTION

(76) Inventor: Gary D. Langeman, 389 East County Road, 31 R.R. 2, Ruthven, Ontario (CA), N0P 2G0

(*) Notice: Subject to any disclaimer, the term of this patent is extended or adjusted under 35 U.S.C. 154(b) by 230 days.

(21) Appl. No.: 10/058,871

(22) Filed: Oct. 25, 2001

(51) Int. Cl.[7] .............................................. A62C 5/02
(52) U.S. Cl. ................................ 239/10; 239/8; 239/9; 239/11
(58) Field of Search ........................... 239/10, 9, 8, 3, 239/11, 302, 303, 304, 306, 307, 308, 310, 311, 312, 335, 369, 398, 400, 407, 418, 422, 428; 523/210, 216; 528/49; 524/376, 377, 378

(56) References Cited

U.S. PATENT DOCUMENTS

| | | | |
|---|---|---|---|
| 4,221,339 A | * 9/1980 | Yoshikawa | .................. 239/704 |
| 5,017,673 A | * 5/1991 | Balatan | ........................ 528/59 |
| 5,058,805 A | * 10/1991 | Anderson et al. | .............. 239/3 |
| 5,328,093 A | * 7/1994 | Feitel | ............................ 239/3 |
| 5,388,761 A | 2/1995 | Langeman | |
| 5,634,571 A | * 6/1997 | Cataneo et al. | ............... 222/80 |
| 6,131,823 A | 10/2000 | Langeman | |
| 6,203,183 B1 | 3/2001 | Mordaunt et al. | |

OTHER PUBLICATIONS

Hare, Clive H., "Chemical Changes Occurring Prior to Application–Epoxy Systems" (Dec. 2000) Journal of Protective Coatings & Linings, pp. 49–62.
Hare, Clive H., "A Review of Polyurethanes: Formulation Variables and their Effects on Performance" (Nov. 2000) Journal of Protective Coatings & Linings, pp. 34–44.
Muir, Glen, "Introduction to Plural Component Spray" (Feb. 2000) Journal of Protective Coatings & Linings, pp. 67–69.
Allen, Bill, "The Not–so–Simple World of Epoxy Curing Agents" (Jun. 1999) Protective Coatings Europe, pp. 38–44.

* cited by examiner

Primary Examiner—Davis W. Hwu
(74) Attorney, Agent, or Firm—Nields & Lemack

(57) ABSTRACT

A method and system are provided for dispensing a colored polymerizing composition. Two reactive components and one color component are pumped from respective containers at a metered volume. The color component, which is preferably a low-viscosity automotive paint is injected into either the first or second stream of reactive component at a point immediately prior to mixing all components in a dispensing device for dispensing the resulting colored fluid mixture onto a surface to be coated. The mixture may be dispensed by pouring or spraying onto the surface. The method and system are particularly useful for mixing and dispensing colored polyurethane or polyurea coatings, such as for spray-on truck bed liners.

14 Claims, 4 Drawing Sheets

THIRD STREAM AUTOMOTIVE COLOR INJECTION

FIELD OF THE INVENTION

This invention relates to plural component coating mixing and delivery methods and systems.

BACKGROUND OF THE INVENTION

Polyurethanes and polyureas have many highly desirable characteristics for the coatings industry. These polymers have well-known abrasion and chemical resistance, flexibility, and impermeability to water when fully cured, as well as being relatively inexpensive and easy to apply.

Modern plural component delivery systems allow the precise metering, mixing and delivery of polyurethane and polyurea components. One example of such a delivery system is described in U.S. Pat. No. 5,388,761 to Langeman. It is popular to dispense such plural component mixes using plural component spray equipment and spray head blending techniques. Reactive components are pumped in metered quantities to a spray gun, and separate streams are blended immediately before atomization. Atomization of the fluid mix may be achieved through various means, with and without air pressure. A low-pressure stream of air may be introduced to the fluid mix at the nozzle end of the gun. One example of such a spray device is the Low Pressure Dispensing Gun described in U.S. Pat. No. 6,131,823 to Langeman.

Polyurethane and polyurea formulations have a particular reactive chemistry which has been considered to make them incompatible with many standard colorants. Polyurethane coatings are produced from the reaction between an isocyanate and a polyol. An isocynate is a chemical group made up of nitrogen, carbon and oxygen bonded in a particular way and represented as —N=C=O or NCO. Polyols are specific types of alcohols containing hydrogen and oxygen in hydroxyl groups (represented by OH). The mixing of isocyanate and polyol results in a urethane reaction. When the isocyanate and active hydrogen compound have two or more reactive sites, a polymeric structure is formed. However, isocyanates can react with any type of hydrogen donor. Therefore, the polyurethane reaction can be blocked in the presence of many types of solvents, including water, which are common ingredients of many colorants. Polyureas are produced from a similar chemical reaction between an isocyanate and an amine.

As a result, the colorants presently used with polyurethane and polyurea components are specially-formulated pigment dispersions which do not react undesirably with the polyol component, and which further do not block the desired reaction between the polyurethane or polyurea components. Such specially-formulated colorants have the disadvantages of being difficult to use due to their thick, paste-like consistency, having few available stock colors and finishes, and having limited distribution and sales locations.

The most common method of incorporating colorant into polyurethane is to premix a compatible colorant formulation into one of the component fluids prior to pumping that fluid to a dispensing gun. In this "batch mix" process, a specially-formulated colorant is introduced into a tank containing the polyol component. The mix of colorant and polyol is known to be stable over a period of time (typically, 1–2 hours without re-mixing). The batch mixture is typically stored in a container such as a pail, barrel, or holding tank. When the mixed component is about to be used to form the intended polyurethane coating, it is necessary to stir the batch mixture in order to re-suspend the colorant evenly throughout the polyol. The stirring process is typically done by hand by a technician and may take 1–2 minutes per gallon.

Batch mixing tends to result in considerable waste, since a batch must be mixed for each intended project. It is important that one does not run out of material during the application, therefore, the batch is always greater than the actual project requirement.

Change from one color to the next is especially problematic when using a batch mix technique. The container in which the color is mixed with the polyol is typically used again and must be emptied and cleaned, otherwise many containers are required. Also, the hose or fluid line through which the colored fluid is pumped will also require purging and may never be free of all of the previous color that was pumped through that fluid line. Known specially-formulated colorants also have a high viscosity (e.g. 5,000 cps), which renders them difficult to flush from fluid lines or to clean with simple wiping methods. Solvents used to flush fluid hoses or clean color containers may also leave a problematic residue which may produce undesirable reactions with the polyurethane or polyurea components.

One alternative to standard container batch mixing for plural component coatings is provided in U.S. Pat. No. 6,203,183 to Mordaunt et al. The system provides an in-line paint mixing system for three-component paint that aims to eliminate much of the waste of individual components associated with batch mix by successively integrating "batches" in very small quantities, referred to as "slugs". The slug quantities of the three components are introduced to each other in a manifold 22, are further mixed together downstream in a flow meter 26, are mixed together more thoroughly in an integrator 62 and are finally mixed again in a static mixer 34. The three-component mixture is then introduced to a spray gun completely mixed. The system relies on a complex set of parameters to achieve accurate metering of the various components, which is impacted by changing pressures and orifice sizes.

The Mordaunt process results in numerous mechanical components of the apparatus being contaminated by the mixed fluid in between the holding tanks and the spray gun. The Mordaunt apparatus must be partly dismantled for cleaning or flushing with solvent. Such cleaning would be time-consuming for a technician.

It is also not apparent how the Mordaunt process, which is intended for paint coatings, would work with fast-reacting chemical components, such as the components used in normal polyurethanes and polyureas. In these applications, it is likely that jamming would occur in the lines due to the reactivity of the component slugs.

There is a demand, particularly in the spray-on truck liner market, to color-match the polyurethane or polyurea coating of the liner to the exterior paint of the automobile. At present, this is accomplished somewhat haphazardly by trying to mix pigments in the polyol tank to approximate the color of the automobile paint. This rarely produces satisfactory results, and the pigments are available in a limited selection of colors and cannot match the specialty finishes (including metallic and pearlescent finishes) that are currently in demand for automotive paints. Another method of coloring the truck liners, by adding a sprayed paint top-coat, also produces unsatisfactory results, in addition to being time-consuming.

SUMMARY OF THE INVENTION

It is an object of the present invention to provide a method and system of plural component polymer coating dispensing that permits common, off-the-shelf paint to be used as a colorant of the coating, in a way that does not contaminate the delivery means of all other components, inclusive of fluid lines, pumps, manifolds, flow meters, or mixing devices, prior to the mixing chamber of the dispensing device.

It is a further object of the invention to allow simplified matching of the coating color to the color code of the paint finish of the surface to be coated or, in another instance, to match the coating color to any other desired color identified by a pre-assigned color code system developed by the paint manufacturer.

It is a further object of the invention to allow for very fast and efficient change of colors due to the fact that the paint delivery system is the only component of the system to come in contact with the actual paint colorant. The other fluid streams are not contaminated by the paint. The paint colorant system is easily cleaned by using a minimal amount of solvent to flush the paint hopper, pump cylinder, and fluid line. The metering of the paint does not involve a mechanical device or blending process between the metering pump and the spray gun mixing device.

The invention also has an object to simplify the cleaning operation by blowing a small amount of cleaning solvent through the hose using a readily available compressed air supply. Because the color component is kept separate from the plural component pumps that meter the first and second fluid streams, it does not affect those pumps or the fluid hoses by leaving problematic solvent residue that may react with the first or second fluid streams. The invention also enables cleaning of the color orifices of the dispensing gun without entering the fluid lines of the other components. The invention eliminates the waste associated with prior batch mixing systems. All of the colorant remaining in the color pump and fluid line can be saved in its original state since it is not mixed with the other streams.

According to a first aspect of the invention, a method is provided for dispensing a colored polymerizing composition. First and second reactive components are stored in separate containers or tanks. A color component is stored in a paint pot. Preferably, a first stream of the first component (A) is pumped in a metered volume from the first tank. The first component is preferably an isocyanate. A second stream of the second component (B) is pumped in a metered volume from the second tank. The second component is preferably a polyol. A third stream of the color component is pumped in a metered volume from the paint pot. The streams are metered in a precise volumetric ratio using a metering means. The ratio may be 1 part A to 1 part B with the color component comprising approximately 2% of the B. Preferably, the metering means includes three separate pumps operated by separate controls, one being a color component metering pump calibrated to deliver a precise volume of fluid in a selected volume ratio corresponding to the volume of one of the other plural component fluids. The color component metering pump, utilizing a powered piston within a cylinder, automatically develops fluid pressure high enough to enable injection into the fluid stream of the other fluid component, also being pumped to the dispensing gun.

According to the method, the third stream is injected into the first stream or the second stream at an injection point (preferably, beyond the metering point of the first or second stream). After this point, the first, second and third streams are mixed within a dispensing device to produce a colored mixture. In a preferred embodiment, the third stream enters the first or second stream through an inlet sharing a common passageway with the first or second stream within the dispensing device before the mixing chamber. (Preferably, the mixture is resident within the mixing chamber of the dispensing device for a period no longer than approximately 1–5 seconds, depending on reactivity and degree of mixing required.) Finally, the colored mixture is dispensed from the dispensing device onto a surface to be coated. The device can dispense the mixture either by pouring a stream of the mixture onto the surface, or by spraying the colored mixture onto the surface with atomization provided at the dispensing device. While air atomization is a preferred embodiment, it is also possible to employ a spray gun with airless atomization as the dispensing device.

Preferably, the third stream is pumped so that the pressure of the stream is sufficient to exceed the pressure of the first stream or the second stream to which the third stream is injected at the injection point.

The color component may comprise a low-viscosity paint such as an automotive paint. Preferably, the third component is a premixed, non-reactive paint formulation with a long shelf life (i.e. 6 months or longer). The invention allows a common automotive paint formulation, that may not necessarily be compatibly mixed into one of the components for extended periods of time, to be injected into the plural component system immediately (i.e. within seconds) prior to mixing within the dispensing gun, thereby eliminating any negative chemical reactions with the components while at the same time mixing thoroughly and effecting even distribution of color in the final coating. Automotive paint, in particular, has a number of advantages for use in polyurethane and polyurea coatings, including:

Automotive paint includes certain ingredients that prevent ultraviolet deterioration (i.e. is "UV stable"). The pigments used are developed to retain their original color for extended periods of time.

Application considerations dictate that automotive paints have low viscosity and excellent flow out properties, allowing for ease of atomization in gravity flow spray guns used for spray painting. The low viscosity of automotive paint allows for a very small diameter fluid line without creating excessive restriction and back pressure. Typical polyurethane colorants or pigment dispersions are typically at least five (5) times higher than automotive paint in relative viscosity and do not pump through small diameter fluid lines over long distances without substantial pressure increases.

Automotive paint refinishing has been developed for the automotive repair market, so that a paint code exists for nearly every automotive vehicle finish. Numerous paint manufacturers, such as Dupont™ and PPG™, have developed formulae to enable distributors across the country to cross-reference the vehicle paint code with their own library of paint mix formulae to manufacture a matching base paint for instant use by autobody repair shops. By taking advantage of this global network of automotive refinish paint color technology, the need to develop a new and costly database is eliminated.

Automotive paints are relatively easy to clean and flush from fluid lines and machinery components using common solvents. Compressed air will readily blow solvents through fluid lines making cleanup and changeover very efficient. This is in contrast to common high viscosity pigment dispersions used to color polyurethanes, which are difficult to flush from fluid lines or to clean with simple wiping methods.

In addition to automotive paints, it is also useful to employ other industrial finishes suitable for coating exterior surfaces. Other industrial finishes may also have the benefit of a pre-existing library of color formulations to accurately reproduce a known color on a repetitive basis. Typically, a catalogue of color chips or samples accompany the reference library to permit visual color comparison.

The ability to use inexpensive off-the-shelf color components has a business advantage for many small coatings application businesses, since the businesses are not required to have the financial resources to develop color technology on their own.

In addition to an isocyanate, the first component may instead be a prepolymer. The second component may be a polyol, polyol blend, amine, or resin.

The dispensing device is preferably a low pressure dispensing gun, such as the low pressure static mix dispensing gun described in U.S. Pat. No. 6,131,823 to Langeman. The dispensing device could also be a dynamic mix device or an impingement mix device utilizing high or low pressure.

Many surfaces may be coated with the colored mixture produced according to the present method. Examples would be exterior or interior surfaces of vehicles, aircraft, marine craft, motorcycles, trailers, automobile accessories (such as running boards, grill guards, and rocker panels), agricultural implements, playground equipment, and outdoor furniture. The method is particularly useful to produce spray-on polyurethane or polyurea truck bed liners. The method is also useful for dispensing other reactive plural component mixtures, such as epoxies.

In addition to atomization dispensing, the mixture may be dispensed by pouring a steady stream over a surface to coat the desired portion of the surface, a process which is particularly useful for furniture applications.

The spray dispensing process is particularly advantageous for spray-on polyurethane truck liners, which are an alternative to preformed plastic drop-in liners. One of the advantages of spray-on truck liners over the preformed plastic drop-in liners is the ability to offer custom colors. The further advantage of enabling the spray-on dealer to instantly source all available automotive colors locally creates a new and powerful market advantage.

According to another aspect of the invention, a system is provided for dispensing a colored polymerizing composition. The system preferably includes a first tank comprising a first reactive component, a second tank comprising a second reactive component, and a paint pot comprising a color component. The first and second tanks, and the paint pot are each connected by separate fluid lines to pump means. The pump means includes separate pumps for delivering a metered volume of each of the three components in three streams according to a predetermined volumetric ratio between the components. To maintain the volumetric ratio, the pump means also comprises a metering means for metering the volume of the first, second and third streams. The system includes an injection means for introducing the third stream into the first stream or the second stream at an injection point beyond the metering means. (The injection point may also simultaneously introduce the third stream into both the first and second streams.) The streams are pumped toward a dispensing device which mixes the first, second and third streams to produce a colored mixture and then dispenses the colored mixture onto a surface to be coated. The dispensing device may operate by pouring the colored mixture onto the surface, or spraying the colored mixture onto the surface using atomization means within the dispensing device. Air and airless atomization are possible variations.

For clarity, the dispensing device includes the means necessary to mix and dispense the colored polymerizing mixture. The mixing chamber and dispenser must be in fluid communication. The preferred embodiment is an ergonomic dispensing gun, such as that provided in Langeman '823, which contains a mixing chamber within the gun's housing before the atomization nozzle. However, it is not intended to limit the dispensing device to a mixing chamber and dispenser within one body. It may also be useful to provide a mixing chamber adjacent to the dispenser (in abutment). For fast-reacting compositions, the mixer will, of necessity, be proximate to the dispenser, since the polymerizing reaction will begin almost immediately and the mixture should not be resident in the apparatus for longer than a few seconds.

It is another aspect of the present invention to provide an improved low pressure dispensing gun including a third inlet for the color component at a point in the gun prior to the mixing chamber.

It is another aspect of the present invention to provide, in an atomized state, a plural component mixture, including a color component, the color component comprising a standard automotive paint.

BRIEF DESCRIPTION OF THE DRAWINGS

In order that the invention may be more clearly understood, the preferred embodiment thereof will now be described by way of example with reference to the accompanying drawings, in which.

DESCRIPTION OF THE PREFERRED EMBODIMENT

Figure 1:
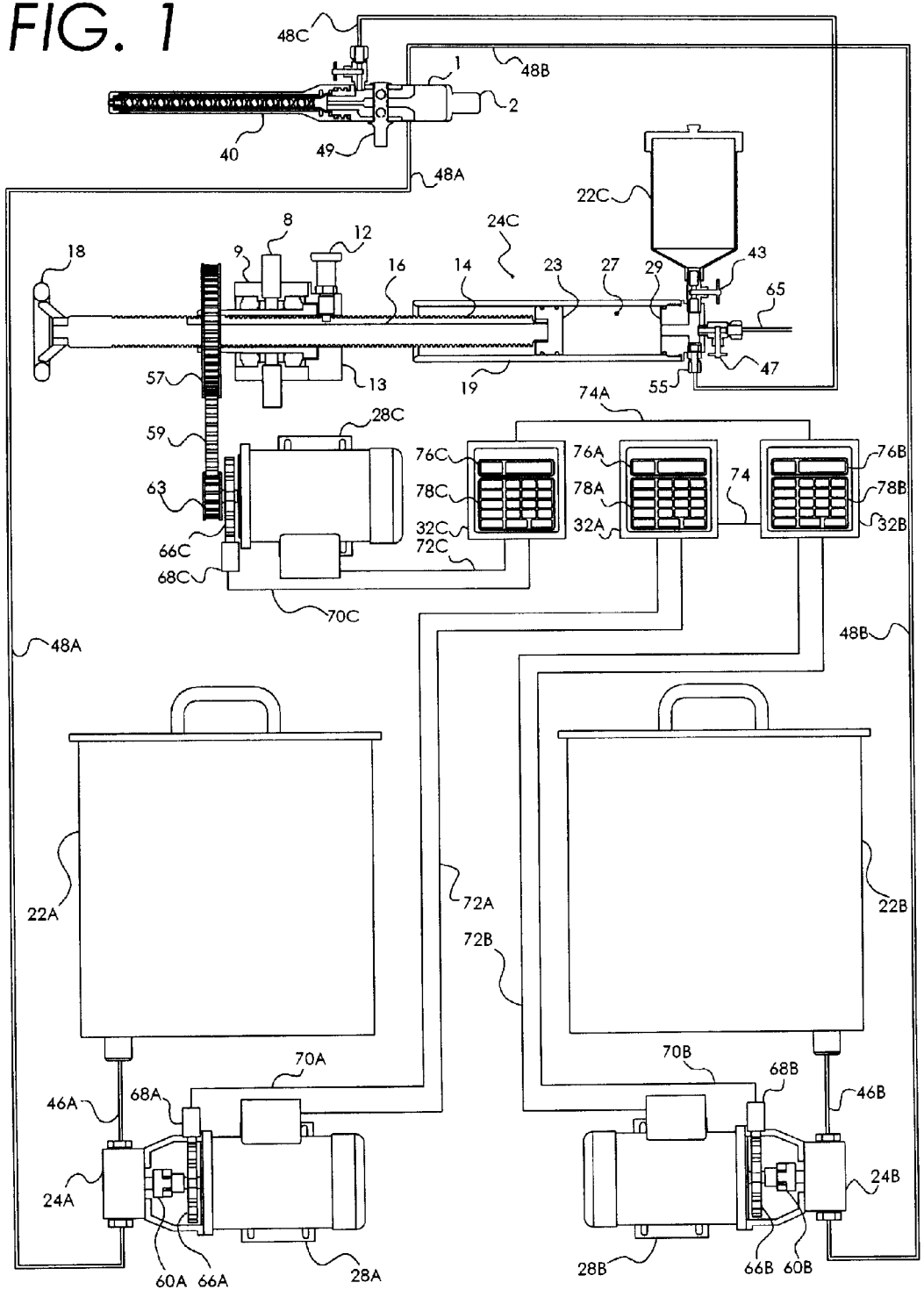
FIG. 1 is a schematic block diagram of the apparatus used to carry out the invention.
Figure 2:
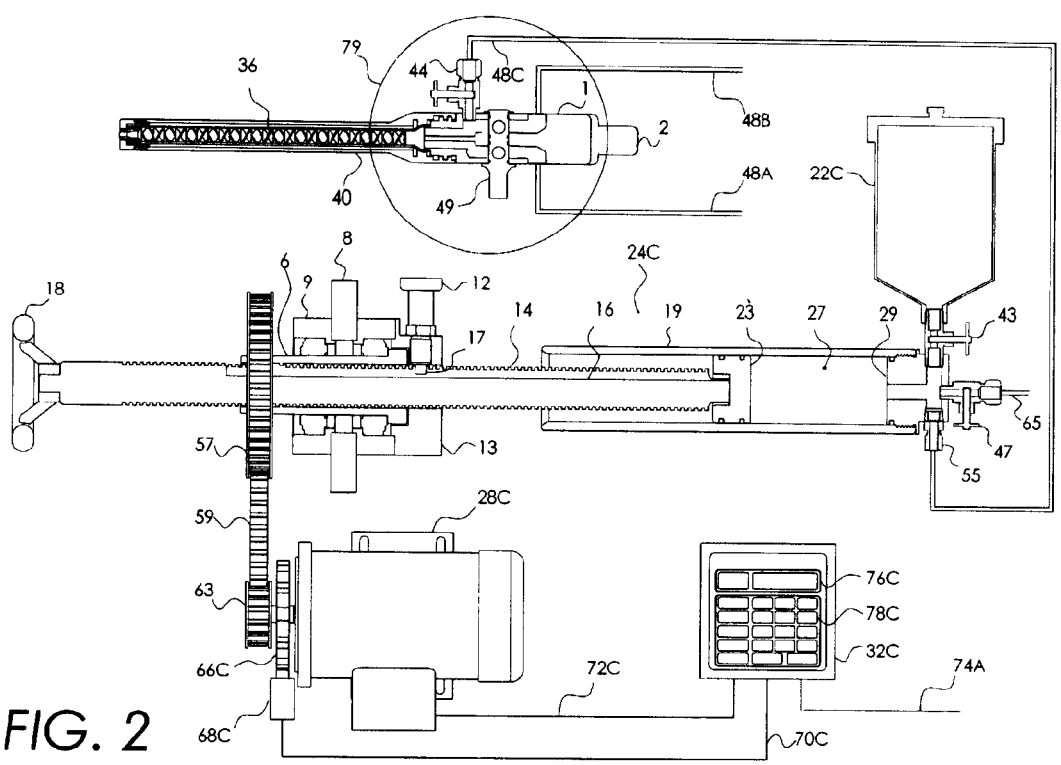
FIG. 2 is a schematic block diagram of the apparatus with particular focus on the color delivery aspects of the invention.

FIGS. 1–4 show the apparatus used to effect the method according to the preferred embodiment. According to the preferred embodiment of the method, the locking pin 17 is retracted from the piston rod key seat 16, and the piston 23 is advanced by manually turning a hand wheel 18 in a clockwise rotation until the piston 23 rests against the cylinder end cap 29.

The paint hopper valve 43 and the compressed air valve 47 are closed while the paint fluid line valve 44 is opened to permit air into the system.

Paint is then poured into the paint hopper 22C, the paint hopper valve 43 is then opened, and the piston 23 is retracted by turning the hand wheel 18 in a counterclockwise rotation. The cylinder 19 defines a void 27, and the retraction of the piston 23 causes the paint in the paint hopper 22C to flow into and to fill the void 27.

Again advancing the piston 23 until a small amount of paint returns into the paint hopper 22C, thereby purging air from the orifices of the cylinder end cap 29 and paint hopper valve 43 and advancing paint into the paint fluid line 48C. The paint hopper valve 43 is then closed and the piston 23 is advanced so that paint fills fluid line 48C, at the same time purging all air out of the paint line 48C and exiting the air through the valve 44 of the spray gun 1. Paint valve 44 of spray gun 1 is then closed so that paint does not escape the system when idle.

Using the locking pin knob 12, the locking pin 17 is then manually engaged into piston rod key seat 16 to permit advancement of piston rod by motorized nut 6 driven by electric motor 28C and belt drive components pulley 63, belt 59 and pulley 57.

Immediately prior to turning on the pumping system, the dispensing gun valve 49 is turned to the on position to permit flow of the first stream and second stream and then the dispensing gun valve 44 is turned to the on position to permit flow of the third stream.

Figure 4:
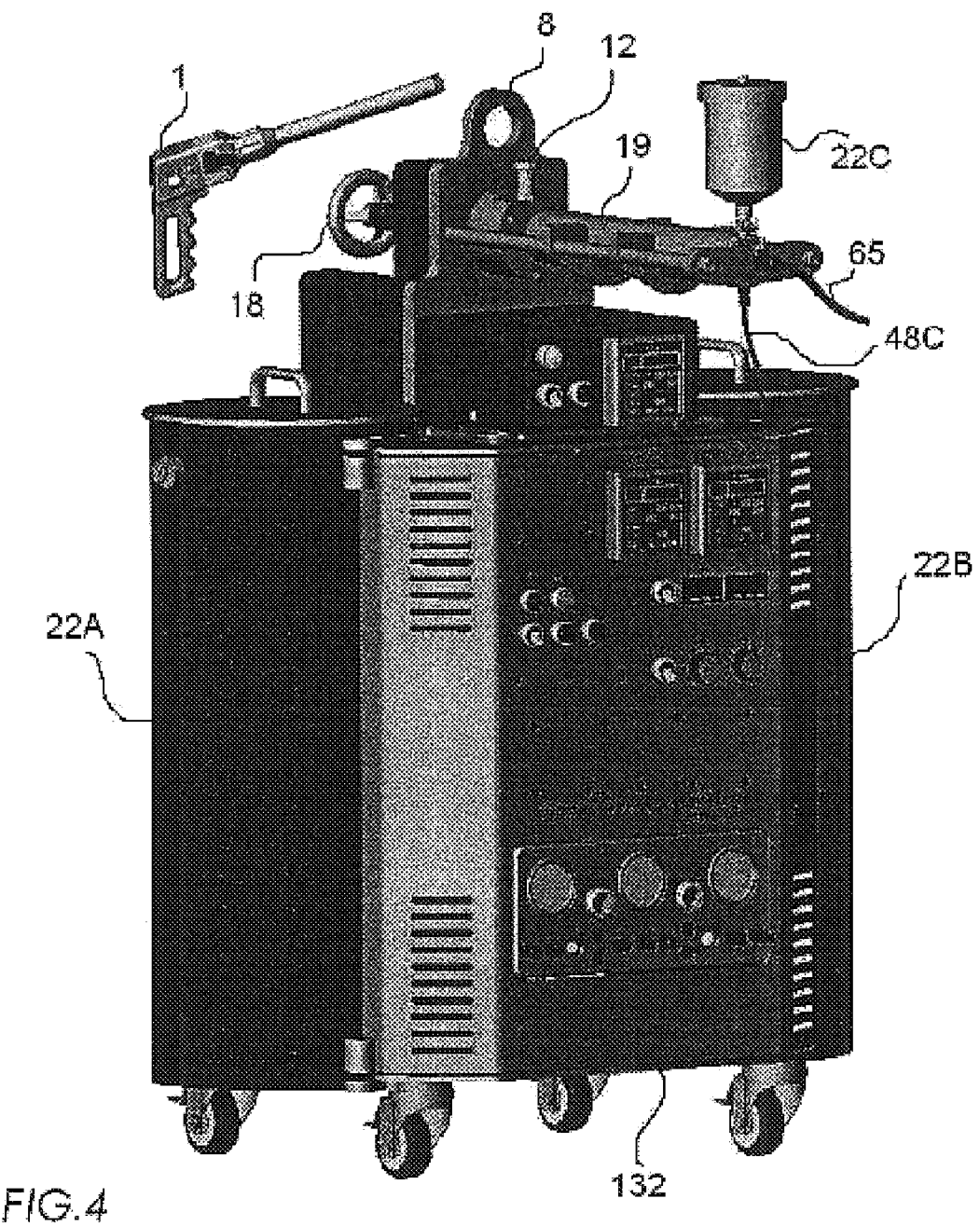
FIG. 4 is a perspective view of a possible housing of the system 132 and the spray gun 1.

When the power is then turned on to activate the pumping system 132 (sample overall system is shown in FIG. 4), all 3 streams are simultaneously controlled by control means 32A, 32B, and 32C, in such a way that all streams are metered by their respective pumps, 24A, 24B and 24C, that are controlled by control means so as to be delivered to the dispensing gun 1 in a precise volumetric ratio.

EXAMPLE 1

To illustrate, the color component may be automotive paint keyed to Ford Motor Corp.™ (paint code Harvest Gold Metallic B2/B5) supplied by PPG Industries, Inc.™, matching code number BC5478, consisting of the following mix formula:

D740 15.2
D753 1.8
D750 5.7
D759 20.3
D745 38.0
D953 417.5
D768 515.2

Please note that for the purpose of this example BASF™ or DuPont™ or Sherwin Williams™ would each have their own cross-reference to the Ford paint code and to PPG and to each other's codes to achieve an equal paint color match.

The two polymerizing components may be the two-component system manufactured by Foam Seal Inc. as "Polyurethane Spray Elastomer System" (part number V8101/FSA29). The first component (Polyol or Resin) corresponds to part number V8101. The second component (Isocyanate or Prepolymer) corresponds to part number FSA29. The components would be mixed in the ratio FSA29/V8101, parts by volume 58.6/100.0.

Figure 3:
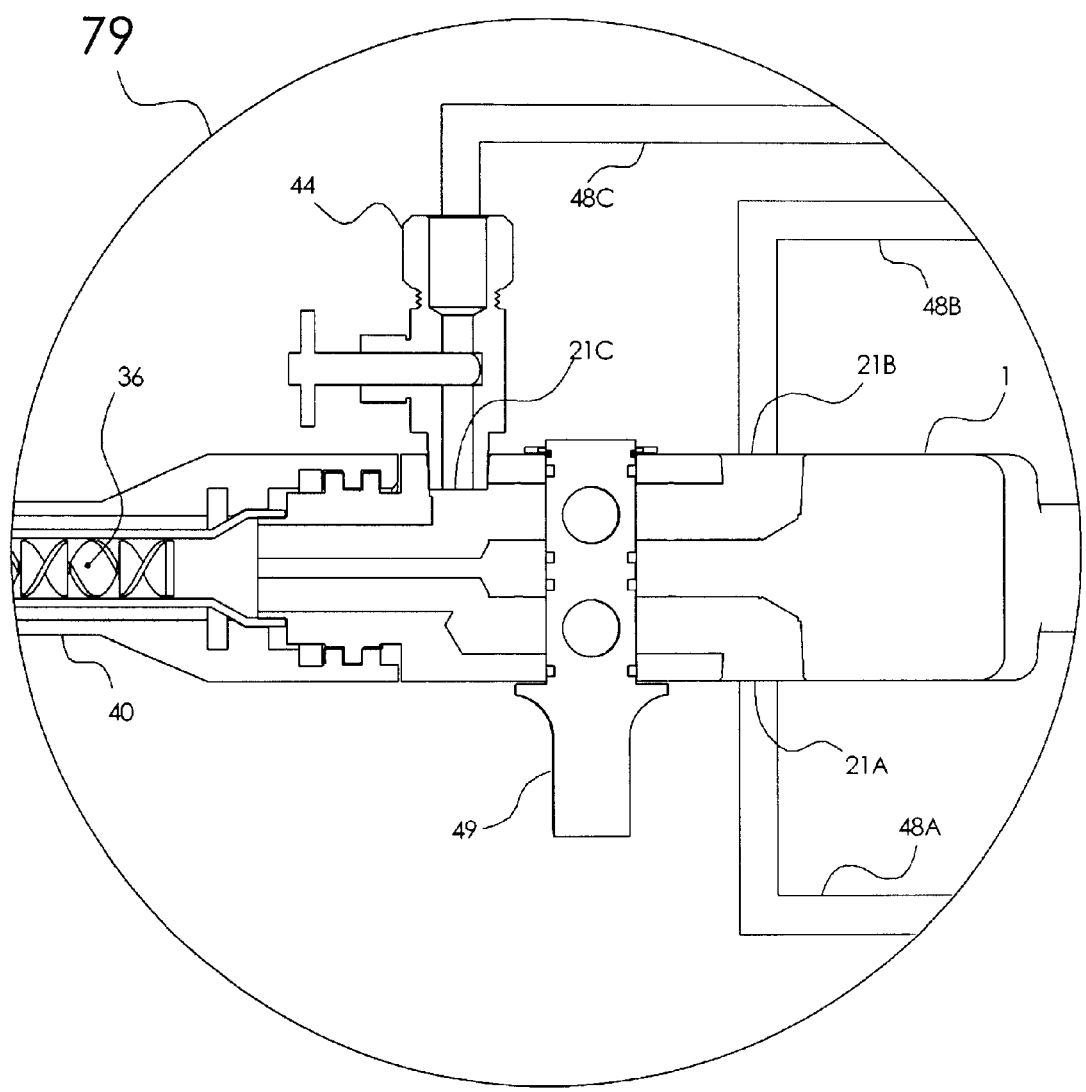
FIG. 3 is a detailed schematic of the area 79 of the spray gun 1 in FIG. 2.

Turning to FIG. 3, as all 3 fluid streams are pumped under pressure into the dispensing gun 1 through respective inlet ports, 21A, 21B, and 21C, the third fluid stream will only flow into inlet 21C after its respective pressure exceeds the pressure of the second fluid stream entering through inlet port 21B and flowing past inlet 21C through the common fluid passageway 25B.

The third stream is delivered to the dispensing gun by a positive displacement piston pump 24C (shown in FIG. 2) that can generate sufficient pressure to exceed whatever pressure the second fluid stream pump 24B develops while metering its respective controlled flow output. The pressure of the second stream fluid will vary depending upon temperature, viscosity, flow rate, hose size and length, and orifice size of the dispensing gun inlet (within a range of approximately 20 to 400 psi for low pressure systems; and as high as 3,000 psi or greater in high pressure, impingement and dynamic mix systems).

The first and second stream pressures are typically balanced or otherwise controlled to be near equal pressure to each other in order to prevent one stream crossing over in the dispensing gun and back flowing down the opposite fluid line causing an out of ratio situation and reacting in the fluid line rather than in the static mixing tube 36 of the dispensing device 1.

The third stream represents, typically, only about 1% to 5% of the first or second reactive component. Because of this small proportion, the pressure of the third stream must be carefully balanced in relation to the first and second streams. By using a single stroke piston pump 24C, while engaged and driving the piston forward, the third stream fluid is not permitted to back up in any way, thereby eliminating any possibility of the second stream crossing over into the third stream. Also, the third stream pump is designed to overcome the pressure of the fluid stream into which the colorant is injected, but without a significant overpressuring of the third stream so as not to back up into the fluid line of the stream injected into.

After starting up the pumping system, it is only momentary for the third stream to overcome the second stream pressure at the third stream inlet 21C, allowing the paint to effectively enter the common passageway 25B (see FIG. 3). The second and third streams flow to the static mixer 36 where they come in contact with the first stream flowing through passageway 25A. All three streams flow through the static mixer 36, and mix thoroughly before being dispensed as a reactive fluid on the surface to be coated.

The dispensing gun 1 provides a means for preventing the color stream (third stream) from contaminating the second stream comprising a shut off valve 49 located between the second stream inlet 21B and the third stream inlet 21C. The first stream inlet 21A is also isolated from the third stream inlet 21C by the same valve 49.

The invention also provides for an efficient means of cleaning and flushing the colorant (paint) from the system to permit changeover to a new color. Using the same procedure as for filling the system with paint, the system can be filled with a small amount of solvent which is then flushed out of the system using the pump 24C in its manual mode.

Before cleaning the third stream pump system, the invention provides for recovery of nearly all of the colorant residing in the pump means and fluid lines. The piston 23 can be retracted to accept all of the paint in the paint pot. The third stream fluid line 48C can then be detached from the dispensing gun and the end placed in the original paint can (not shown). The pump can then be manually driven to pump all of the remaining paint from the cylinder into the paint can. The remaining amount in the fluid line 48C can then be blown out of the fluid line by opening the compressed air valve 47 and flushing all remaining paint in the paint fluid line into the original paint can.

The solvent cleaning of the cylinder and paint fluid line can be achieved in the same way using only a small amount of cleaning solvent.

The foregoing is considered as illustrative only of the principles of the invention. Further, since numerous modifications and changes will readily occur to those skilled in the art, it is not desired to limit the invention to the exact construction and applications shown and described, and accordingly, all suitable modifications and equivalents may be resorted to, falling within the scope of the invention and the appended claims and their equivalents.

All patents are incorporated by reference in their entirety to the same extent as if each individual patent was specifically and individually indicated to be incorporated by reference in its entirety.

What is claimed is:

1. A method of dispensing a colored polymerizing composition, the method comprising:
   (a) storing a first reactive component in a first tank;
   (b) storing a second reactive component in a second tank;
   (c) storing a color component in a paint pot;
   (d) pumping a metered volume of the first reactive component from the first tank comprising a first stream using a metering means;

(e) pumping a metered volume of the second reactive component from the second tank comprising a second stream using the metering means;

(f) pumping a metered volume of the color component from the paint pot comprising a third stream using the metering means;

(g) injecting the third stream into the first stream or the second stream at an injection point beyond the metering means;

(h) mixing the first, second and third streams within a dispensing device to produce a colored mixture; and (i) dispensing the colored mixture from the dispensing device onto a surface to be coated by either pouring the colored mixture onto the surface, or spraying the colored mixture onto the surface using atomization means within the dispensing device.

2. The method according to claim 1 wherein step (f) further comprises pumping the third stream to produce sufficient pressure to exceed the pressure of the first stream or the second stream to which the third stream is injected at the injection point.

3. The method according to claim 1 wherein the color component comprises a low-viscosity paint.

4. The method according to claim 3 wherein the color component comprises a premixed, non-reactive paint formulation with a relatively long shelf life.

5. The method according to claim 3 wherein the color component comprises an automotive paint.

6. The method according to claim 1 wherein the first reactive component comprises a component selected from the group consisting of polyols, polyol blends, and resins.

7. The method according to claim 1 wherein the second reactive component comprises a component selected from the group consisting of isocyanates and prepolymers.

8. The method according to claim 1 wherein the dispensing device comprises a dispensing gun comprising a mixing means.

9. The method according to claim 1 wherein the third stream is injected into the first stream or the second stream at the injection point between the metering means and the dispensing device.

10. The method according to claim 9 wherein the third stream is injected into the first stream or the second stream at the injection point sharing a common passageway with the first stream or the second stream within the dispensing device.

11. The method of claim 1 wherein the colored mixture is resident within the dispensing device for a period of less than 5 seconds.

12. The method of claim 1 wherein the surface to be coated comprises an exterior or interior surface selected from the group consisting of: a vehicle, an aircraft, a marine craft, a motorcycle, a trailer, an automobile accessory, an agricultural implement, a piece of playground equipment, and a piece of outdoor furniture.

13. The method according to claim 12 wherein the surface to be coated comprises a truck bed.

14. A system for dispensing a colored polymerizing composition, the system comprising:

(a) a first tank comprising a first reactive component;

(b) a second tank comprising a second reactive component;

(c) a paint pot comprising color component;

(d) a pump means for pumping a metered volume of the first reactive component from the first tank comprising a first stream; and for pumping a metered volume of the second reactive component from the second tank comprising a second stream; and for pumping a metered volume of the color component from the paint pot comprising a third stream; the pimp means comprising a metering means for metering the volume of the first, second and third streams;

(e) an injection means for introducing the third stream into the first stream or the second stream at an injection point beyond the metering means;

(f) a dispensing device for mixing the first, second and third streams to produce a colored mixture; and for dispensing the colored mixture from the dispensing device onto a surface to be coated by either pouring the colored mixture onto the surface, or spraying the colored mixture onto the surface using atomization means within the dispensing device.

\* \* \* \* \*